Figure 1:
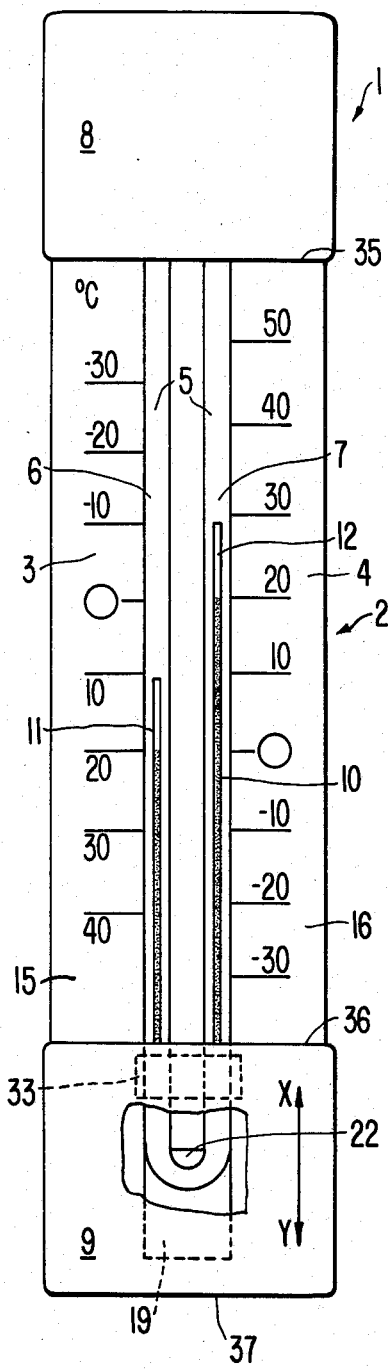

United States Patent [19]

Faller

[11] Patent Number: 4,627,741
[45] Date of Patent: Dec. 9, 1986

[54] MAXIMUM-MINIMUM-THERMOMETER

[76] Inventor: Dagmar Faller, Otto-Schott-Strasse 19, D-6980 Wertheim, Fed. Rep. of Germany

[21] Appl. No.: 648,511

[22] Filed: Sep. 7, 1984

[30] Foreign Application Priority Data

Sep. 9, 1983 [DE] Fed. Rep. of Germany ....... 3332644

[51] Int. Cl.[4] ............................................. G01K 5/20
[52] U.S. Cl. .................................. 374/104; 374/190; 374/194
[58] Field of Search ............... 374/102, 104, 105, 106, 374/208, 190, 191, 192, 194; 116/296; 73/709, 747; 235/70 R

[56] References Cited

U.S. PATENT DOCUMENTS

| 498,651 | 5/1893 | Hicks | 374/102 |
|---|---|---|---|
| 2,289,717 | 7/1942 | Montgomery | 235/70 R |
| 2,299,284 | 10/1942 | Steidman | 116/296 |
| 2,370,968 | 3/1945 | Kahl | 374/104 |
| 2,930,234 | 3/1960 | Harada | 374/104 |
| 3,054,293 | 9/1962 | Friedrichs | 374/104 |
| 3,522,655 | 8/1970 | Kilpatrick et al. | 235/70 R |

FOREIGN PATENT DOCUMENTS

| 2730682 | 1/1979 | Netherlands | 374/192 |
|---|---|---|---|
| 3013574 | 10/1981 | Netherlands | 374/104 |
| 1470971 | 4/1977 | United Kingdom | 374/190 |

Primary Examiner—Charles Frankfort
Assistant Examiner—Thomas B. Will
Attorney, Agent, or Firm—Berman, Aisenberg & Platt

[57] ABSTRACT

The invention refers to a maximum-minimum thermometer (1) with a base plate (2) having arranged thereon temperature scales 3,4, with an extension medium, a mercury filament (10) and magnetically attractable display pins (11,12) contained in a U-shaped capillary tube 5, with permanently magnetized strips (13,14) parallel to the two legs (6,7) of capillary tube (5) for the temporary fixing of the display pins (11,12) showing the max/-min. temperatures, while said pins can be returned by magnet (33) moving past the capillary tube (5) outside it to their base position, wherein the strips (13,14) are disposed on the front or rear of the base plate (2) behind the two legs (6,7) of capillary tube (5) or are disposed laterally therefrom and secured there, and in that on base plate (2) a slide element (9) is movably disposed to move along the two legs (6,7) of capillary tube (5) and along said temperature scales (3,4) and overlapping them, on which at least one permanent magnet (33) is invisibly disposed with magnetic force exceeding that of the strips (13,14), by which the two display pins (11,12) can be returned simultaneously due to the corresponding motion of the slide element (9) from their extreme positions to the startline on the ends of the mercury filament (10).

11 Claims, 21 Drawing Figures

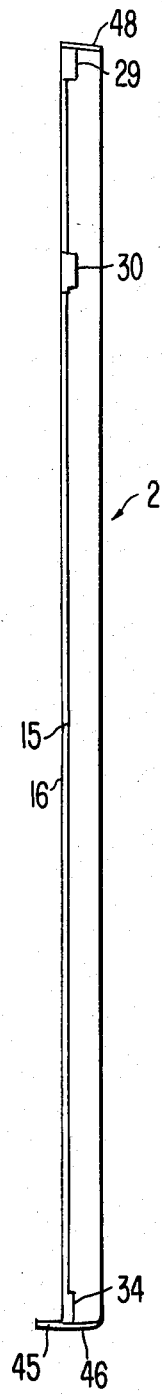
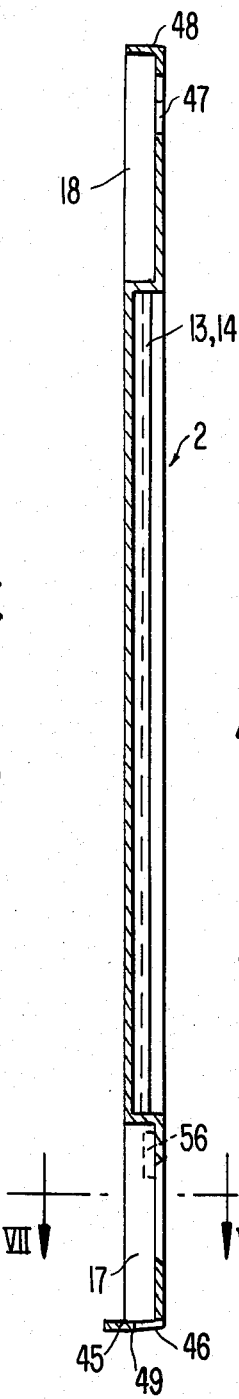
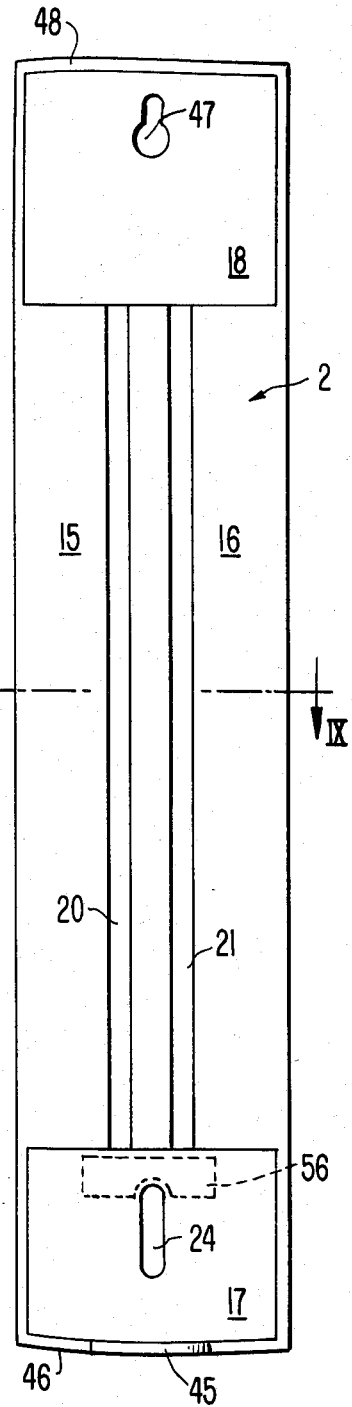
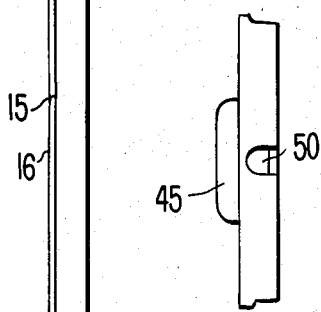
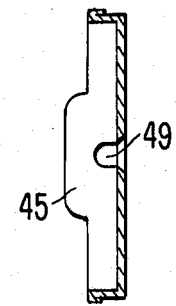
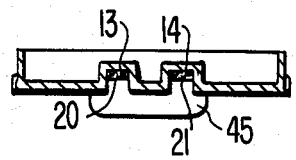

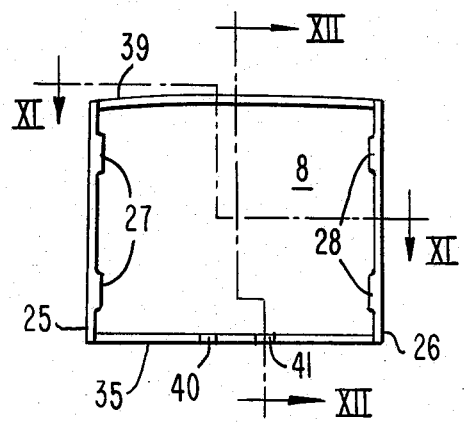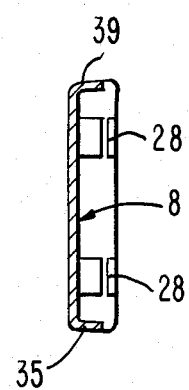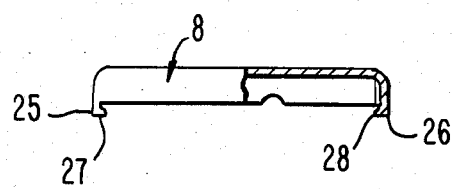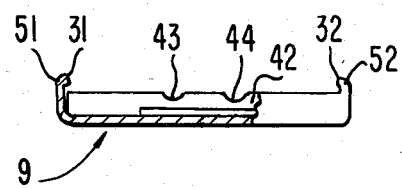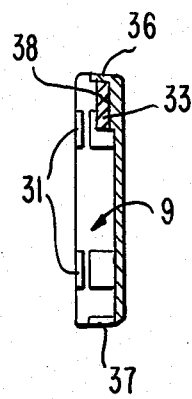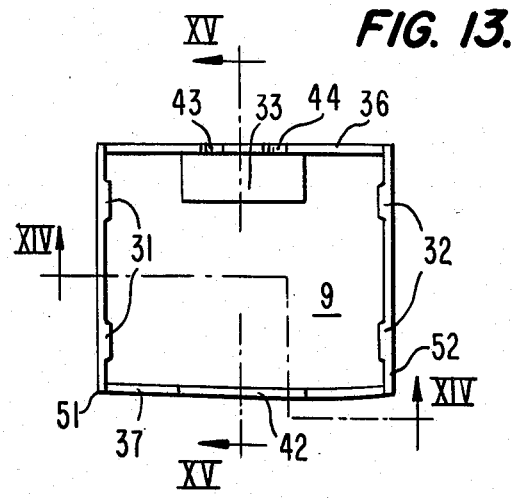

4,627,741

MAXIMUM-MINIMUM-THERMOMETER

The invention concerns a maximum-minimum thermometer.

Such thermometers are known, but are disadvantageous to the extent that the return of the display pins has to be done by separate permanent magnets which must be carried loose by the user in his pockets or the like and therefore are frequently lost. In other thermometers, the magnets are suspended on strings or the like which gives the thermometer a not exactly advantageous appearance.

The invention is therefore based on the object of creating a thermometer of the type named above which is simple in design, has as few parts as possible, is economic to manufacture, is easily assembled, available at all times and operative permanently, which avoids the loss of the return magnets and also has a flat and pleasing design, while the functional parts which are not important for the observer should be left as far as possible invisible.

This object is solved according to the invention by the features in the main claim.

Further inventive and advantageous developments of the invention emerge from the sub-claims.

The inventive thermometer is striking because of its elegant appearance due to its flatness. The fixed mounting of the magnets avoids their loss. All the functional parts remain invisible from the outside. Assembly is simple and is quickly performed by hand.

Due to its flat and space-saving design the packing and mailing costs are low. And lastly the inventive thermometer can also be presented in blister or skin packings to promote sale in self-service stores.

Figure 2:
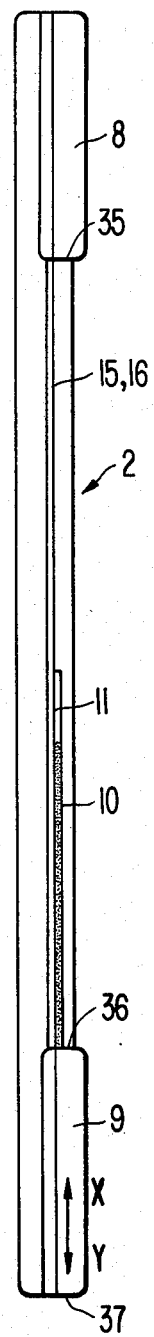
Figure 3:
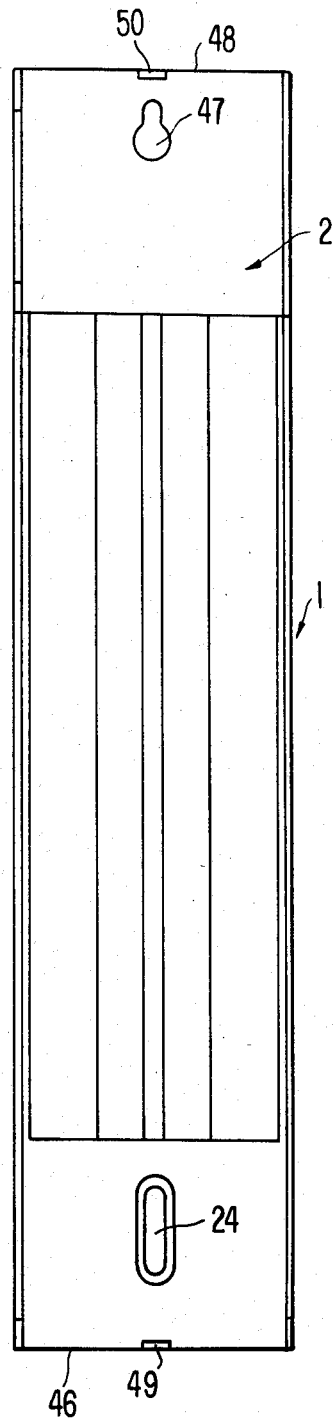
Figure 16:
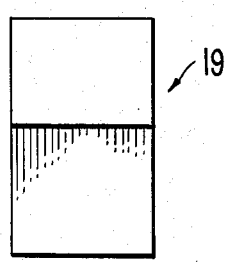
Figure 18:
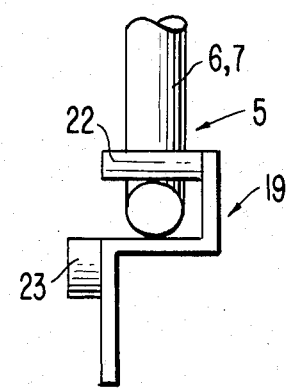
Figure 17:
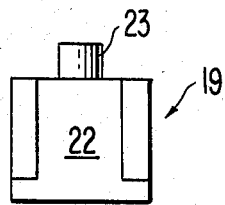
Figure 19:
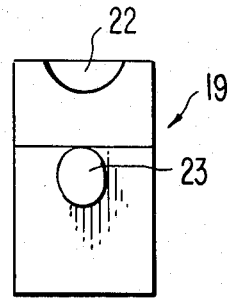
Figure 21:
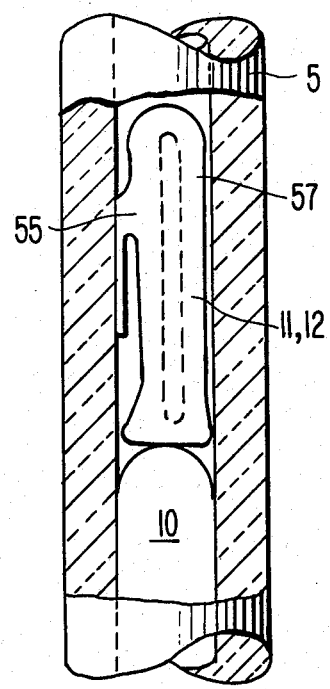
Figure 20:
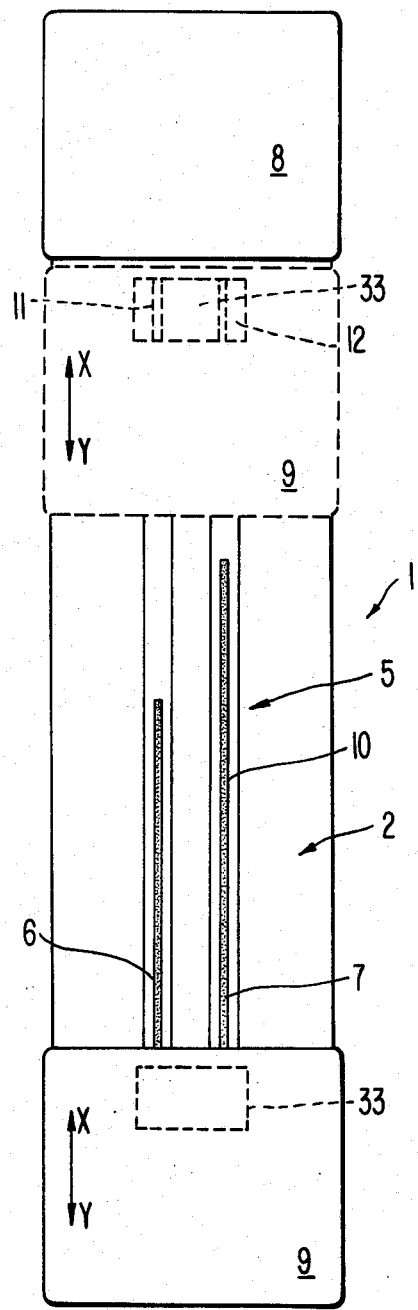

Further features, details and advantages emerge from the following description of a preferred embodiment of the invention as well as from the drawing enclosed. These show:

FIG. 1 a front view of the inventive maximum-minimum thermometer with a base plate carrying the temperature scales, a U-shaped capillary tube as well as covering caps arranged on the ends of the base plate covering the ends of the capillary tube;

FIG. 2 a side view of the thermometer as in FIG. 1;

FIG. 3 a rear view of the thermometer as in FIG. 1;

FIG. 4 a side view of the base plate as in FIG. 1;

FIG. 5 a view of the base plate as in FIG. 4 from above;

FIG. 6 a longitudinal section through the base plate along the sectional line VI—VI in FIG. 8;

FIG. 7 a cross section through the base plate along the sectional line VII—VII in FIG. 6;

FIG. 8 a front view of the base plate as in FIG. 1;

FIG. 9 a cross section through the base plate along the sectional line IX—IX in FIG. 8;

FIG. 10 a rear view of the top cover cap according to FIG. 1;

FIG. 11 a plan view along the sectional line XI—XI in FIG. 10 showing in part the top cover cap;

FIG. 12 a longitudinal section through the top cover cap along the line XII—XII in FIG. 10;

FIG. 13 a rear view of the lower cover cap as in FIG. 1;

FIG. 14 a partially sectioned view from below of the lower cover cap along the line XIV—XIV in FIG. 13;

FIG. 15 a longitudinal section through the lower cover cap along the line XV—XV in FIG. 13;

FIG. 16 a front view of a holder invisibly arranged below the lower cover cap of FIG. 13 for fixing the U-shaped capillary tube of FIG. 1 in its operating position;

FIG. 17 a plan view of the holder in FIG. 16;

FIG. 18 a side view of the holder in FIG. 16;

FIG. 19 a rear view of the holder in FIG. 16;

FIG. 20 a total view of the thermometer of FIG. 1 with the lower cover cap as a slide element with permanent magnet in the idle and working position and FIG. 21 a partial view showing partially in section the capillary tube with the mercury filament and a display pin having in the operating position a brake element resiliently abutting the inner wall of said capillary tube.

FIG. 1 shows a maximum-minimum thermometer 1 according to the invention with a base plate 2 having preferably two temperature scales 3, 4, a U-shaped capillary tube 5 arranged on the base plate 2 with a left leg 6 and a right leg 7 as well as an upper cover cap 8 arranged on the top end of the thermometer 1 and a lower cover cap 9 on the bottom end of the thermometer 1.

In the two legs 6, 7 of capillary tube 5 there is an extension medium (not shown), a mercury filament 10 as well as magnetically attractable display pins 11, 12. These display pins 11, 12 are used for the later determination of extreme temperatures, e.g. the lowest temperature at night and/or the highest daytime temperature. In their initial position the display pins 11, 12 contact respectively the two ends of the mercury filament 10. They are moved forward by the latter during the fall or rise of the ambient temperature up to the prevailing extreme temperature in the lower or upper temperature range and stay there in their extreme position even when the mercury filament 10 has moved due to a rise or fall in temperature from the formerly prevailing extreme temperature. The maintenance of the extreme positions of the two display pins 11, 12 is effected by permanently magnetic strips 13, 14 arranged behind the two legs 6, 7 of capillary tube 5 or laterally therefrom while said strips 13, 14 extend along capillary tube 5, and when reaching the extreme temperatures, they magnetically attract the display pins at this temperature and hold them in this way in their extreme position.

The return of the two pins 11, 12 to the start position above the ends of the mercury filament 10 is explained in detail below.

First we shall explain some design peculiarities of the inventive thermometer 1 and its components, especially base plate 2 and the upper and lower cover caps 8, 9:

Base plate 2, as can be seen especially in FIGS. 4–9 is manufactured with peripheral stiffening ribs or bars, which are not individually described here, preferably in one piece, and are preferably made of plastically moldable material in the injection molding process. This material could for example be plastic, acryl glass, polystyrol ® or the like, i.e. a transparent or translucent material which gives the thermometer 1 a very pleasing appearance, because the special new design of thermometer 1 permits the use of such materials. The inventive design of thermometer 1 also means that, as shown in FIG. 2, it is extremely flat in the assembled state which gives it a substantially more compact and elegant appearance against the known maximimun-minimum thermometers.

In detail base plate 2 according to the invention has the following peculiarities: on its top on bottom ends there are recesses 17, 18 in which firstly the necessary widening for the extension medium of the capillary tube 5 to be inserted later is housed and secondly the holding clip 19 for securing capillary tube 5 in its operational position is disposed there. On the two projecting planar surfaces 15, 16, the two temperature scales 3, 4 are mounted, preferably printed, for reading momentary and the maximum-minimum temperatures.

The two legs 6, 7 extending between the two planar surfaces 15, 16 from the bottom upwards of capillary tube 5 are preferably inserted in their operating position in grooves 20, 21, formed in the base plate 2, which extend between the recesses 17, 18 from the bottom upwards, as shown in FIGS. 8, 9.

The cross section of grooves 20, 21 is rectangular in this embodiment, but it can also be semicircular or have any other conveivable form. The width of groove B is slightly larger than the diameter D of the legs 6, 7 of capillary tube 5, so that the legs can be inserted with adequate play in the grooves 20, 21. Preferably the legs 6, 7 should be sunk in their operating position up to about half their length in the grooves 20, 21 so that the mercury filament 10 contained in them and the temperature scales 3, 4 are practically on one level and thus equally far from the observer. This avoids the so-called parallax errors which may lead to inaccurate readings. This provides for capillary tube 5 a certain protection against mechanical damage or fracture, because it is guided in grooves 20, 21 and partially sunk therein. Moreover due to grooves 20, 21 the assembly of the above mentioned permanent magnetic strips 13, 14 in grooves 20, 21 is made substantially easier, because the latter provide the later operating position of the strips 13, 14.

Preferably the strips 13, 14 are only provided on the base of the grooves 20, 21 and are there permanently secured by suitable adhesive so that in the operating position they are completely covered by the two legs 6, 7 of capillary tube 5 and thus are invisible. If necessary or desired, the strips 13, 14 can alternatively or additionally be laterally mounted in the grooves 20, 21 so that they come to rest in the operating position on the sides of capillary tube 5. This would have the aesthetic disadvantage that they could then be seen.

According to the invention the strips 13, 14 are brightly coated, preferably in white on the side facing the observer. In this way they facilitate observation of the ends of the mercury filament 10. In addition they are then no longer noticed by the observer and are not found to be disturbing if their original colour was e.g. black, grey or brown. Formerly the contrast of the mercury filament and thus its readability was as a rule improved by a bright coat on the rear of the capillary tube, e.g. by a white enamel glass layer, because it is clearly visible against this background. But this measure can be omitted with advantage when using the inventive thermometer 1 because the bright or white gleaming strips 13, 14 behind capillary tube 5 form the suitable background for the mercury filament 10, which also dispenses with the need for a further coating of capillary tube 5. A capillary tube with enamel glass layer is substantially more costly than uncoated material.

For assembly and securing of the U-shaped capillary tube 5 in its operating position a holder clip 19 shown in FIGS. 16–18 is used. Clip 19 has a bracket 22 which overlaps the capillary tube 5 in its bent area and secures it, as well as a peg 23 which in its operating position is introduced into a perforation 24 formed as a longitudinal slot on base plate 2 and is there permanently secured after the exact calibration for temperature of capillary tube 5 with respect to the temperature scales 3, 4, and preferably is welded, ultrasonically welded or glued.

After manufacture of a permanent connection between base plate 2 and capillary tube 5 it is only necessary for the top and bottom cover caps 8, 9 to be fixed on base plate 2 and secured in the operating position.

As shown in FIGS. 10–12 the top cover cap 8 has in its operating position on its lateral edges 25, 26 two claw-shaped projections 27, 28 which during the assembly on base plate 2 can be snapped over its lateral edges so that the top cover cap 8 is permanently located there and can only be removed from it or from base plate 2 with great and deliberate effort. The possible longitudinal displacement of the top cover cap 8 along the edges of base plate 2 is prevented by stops thereon 29, 30, as shown in FIG. 4.

As shown by FIGS. 13–15, the lower cover cap 9 has in its operating position on its lateral edges 51, 52 respectively two claw-shaped projections 31, 32 which during assembly on the base plate 2 can be snapped over its lateral edges to that the lower cover cap 9 is permanently secured there and can only be removed from it or from base plate 2 with great and deliberate effort. However in contrast to the top cover cap 8, the lower cover cap 9 on base plate 2 can only be displaced in the longitudinal direction of the temperature scale 3, 4 or of the two legs 6, 7 of capillary tube 5 in the directions XY from its idle position shown in FIGS. 1, 2 and 20 over the entire length of temperature scales 3, 4, whereby the lateral edges of base plate 2 form the guides for the overlapping claw-shaped projections 31, 32 of the lower cover cap 9. Possible longitudinal displacement of the lower cover cap 9 beyond the bottom idle position is prevented by stops 34 formed on the edges of base plate 2, as shown in FIG. 4. The lower edge 35 of the top cover cap 8 serves as the upper stop for the upwards-movable cover cap 9, and the upper edge 36 of the lower cover cap 9 comes to rest in its uppermost working position against the top cover cap 8.

As shown in FIGS. 13 and 14, the lower cover cap 9 has on its inside facing away from the observer and preferably in the vicinity of its upper edge 36 a molded surface 38 on which it has permanently mounted a permanent magnet 33 in the operating position, which is preferably glued on. The shaped or molded surface 38 on the lower cover cap 9 facilitates the assembly of the permanent magnet 33, since it shows its later operating position precisely to the fitter and thereby excludes in advance later assembly errors or mistakes as well as the resultant functional defects in thermometer 1.

The permanent magnet 33 has to have a stronger magnetic force than the two strips 13,14. The latter should be magnetized to be "narrow-polar", while the permanent magnet 33 should be "broad-polar".

The top cover cap 8 and the lower cover cap 9 are substantially similar in design, as shown in FIGS. 10–12 and FIGS. 13–15. They differ slightly due to the features below:

The top cover cap 8 is fully closed on its upper edge 19 since it is fixed on the base plate 2. By contrast the lower cover cap 9 has on its lower edge 37 (which corresponds to the upper edge 39 of the top cover cap 8) a major groove 42 so that the lower cover cap 9 can be moved upwards along the two legs 6,7 of the capillary tube 5, wherein the groove 42 on the lower edge 37 of the lower cover cap 9 slides almost without contact over the two legs 6,7 of capillary tube 5. A further difference between the top and lower cover caps 8,9, as stated above, is the surface 38 which is on the lower cover cap 9 on its inside near the top edge 36 for the mounting of the permanent magnet 33.

The top cover cap 8, like the lower one 9, has grooves 40,41 or 43,44 respectively on the side facing the temperature scales 3,4 on its edge 35 or 36 which come to rest or slide into the operating position via the two legs 6,7 of capillary tube 5.

For the sake of completeness we note that on the lower edge 46 of the base plate 2 there is a projecting bracket 45 which closes the groove 42 on the lower cover cap 9 in its base or idle position. In this way the housing of the inventive thermometer 1 is closed on all sides.

Should it be necessary to arrange the top cover cap 8 instead of the lower cover cap 9 to be movable in the X-Y direction on base plate 2, and instead to fix the lower cover cap 9 on the base plate 2 so that it is immovable, this is of course possible after the relevant design changes. But in this case care must be taken that the top cover cap 8 does not again move the display pins 11,12 upwards, which were formerly moved downwards by cover cap 8, when the cover cap 8 is pushed back into its base or idle position. This could be done e.g. by mounting the top cover cap 8 resiliently on base plate 2. When pushing the top cover cap 8 into its base position, it would have to be lifted slightly with respect to the capillary tube 5, to increase correspondingly the spacing from the latter and at the same time to reduce the magnetic force acting on the display pins 11,12 so that this force is no longer adequate to draw the 2 display pins 11,12 upwards. However the solution explained above and shown in the drawing, i.e. using the lower cover cap 9 as the return element for the two display pins 11,12, is the more rational solution. It is more functional, simpler in design and is therefore more economical.

Lastly the housing of base plate 2 has a suspension eye 47 near its top edge 48, on which the thermometer 1 can be hung if necessary. Moreover base plate 2 has a recess 49,50 on its lower and upper edge 46,48 respectively, in which the spikes of a holder device grasping the thermometer 1 from above and below in clamping manner (not shown in the figure) can engage, to mount the thermometer 1 pivotably and to be able to pivot it in the direction of the observer if needed.

The modus operandi of the inventive thermometer 1 is as follows:

Should e.g. after a certain time the thermometer 1 have moved into the area of the higher or lower temperatures at least once then, as is known, the two display pins 11,12 are suspended at greater or lesser height above the two ends of the mercury filament 10 in the capillary tube 5, because they are held in this position by the strips 13,14 behind them. But should now the two display pins 11,12 return to their initial position above the two ends of the mercury filament 10, the lower cover cap 9 will simply be moved in the direction of arrow X firstly up to its top stop and then in direction Y to its base or idle position. The stronger permanent magnet 33 moves on the lower cover cap 9 past the two display pins 11,12, carries them with it, and returns them downwards until they again encounter the two ends of the mercury filament 10. The weaker permanent magnetic strips 13,14 allow this return of display pins 11,12, because they have to give way to the stronger force of the stronger magnets 33. It is again stressed that the permanent magnets 33 can be mounted visibly or invisibly on the lower slide element 9. It must only be arranged that the magnetic force of the permanent magnet 33 is enough to return the display pins 11,12 from their extreme positions to their start line above the end of the mercury filament 10.

The slide element 9 can be detachably mounted on base plate 2, while a ferro-magnetic plate 56 must then be placed on base plate 2, on which the permanent magnet 33 on the slide element 9 adheres in the idle position of slide element 9. The slide element 9 is removed only for return of the display pins 11,12 from the base plate 2 and then is replaced. A ferromagnetic plate 56 is shown by the broken lines in FIGS. 6 and 8.

Finally we can dispense altogether with the magnetic strips 13,14 if the display pins 11,12 are held in other ways in their extreme positions: they could be fitted at least with 1 brake element 55, which contacts resiliently in the operating position the inside of the capillary tube 5. The display pin 11,12 then remains in its extreme position by frictional force when the mercury filament 10 moves back. If the body of display pin 11,12 were made of glass, the brake element 55 could be an elastic glass thread attached to the body of display pin 11,12 which is hot-molten therewith during production of the display pin 11,12.

The inventive maximum-minimum thermometer 1 above differs from the prior art in the following advantages in particular:

1. The housing is very flat due to the design features above and hides the functional parts, e.g. the strips 13, 14, permanent magnet 33 and the clip 19 holding the capillary tube 5 in its operating position, in its interior invisibly.

2. Due to the invisible arrangement of the functional parts, the thermometer is given a pleasing and elegant appearance.

3. Owing to the permanency of the permanent magnet 33 on the inside of the movable lower cover cap 9, it is always accessible and cannot be lost.

4. Due to the small number and simplicity of the parts needed for thermometer 1, the total cost for production, interim storage, assembly, packing, transport and sales support measures(e.g. display in self-service stores, wrapping in blister or skin packings and the like) is extremely low against the known thermometers.

I claim:

1. Maximum-minimum thermometer with a base plate having a top end and a lower end, temperature scales arranged on said base plate, with a U-shaped capillary tube having a top end and a lower end and having two legs connected at their lower ends by a bent section containing an extension medium, a mercury filament as well as magnetically attractable display pins and having on both legs of the capillary tube parallel permanent magnetic adhesive strips for the temporary fixing of the display pins showing the maximal-minimal temperatures which can be returned to their initial position by magnets moved on the outside of said capillary tube, wherein the adhesive strips (13, 14) are arranged and secured on the front or the back of said base plate (2) behind the two legs (6, 7) of the capillary tube (5) or laterally therefrom, and in that on said base plate (2) a slide element (9) is provided which is movable along the two legs (6, 7) of the capillary tube (5) and along the temperature scale (3, 4) and overlaps them, on which at least one permanent magnet (33) is arranged with a fource which exceeds the magnetic force of the adhesive strips (13, 14) by which magnetic force the two display pins (11, 12) can be simultaneously returned by a corresponding movement of said slide element (9) from their extreme positions to their initial positions at the ends of the mercury filament (10), and wherein said slide element forms a lower end cap for covering said bent section of said U-shaped capillary tube and is movable from the bottom of the lower end of the base plate to the extreme positions of the display pins for returning said display pins to their initial positions when the lower end cap is returned to the bottom of the lower end of the base plate.

2. Thermometer as in claim 1, wherein it has on its top end an upper covering cap (8) which covers the top end of the capillary tube (5).

3. Thermometer as in claim 2 wherein the upper covering cap (8) is firmly secured on the base plate (2) of the thermometer (1), and in that the lower covering cap (9) which forms the slide element (9) and which carries the permanent magnet (33) is removably arranged on the base plate (2) of the thermometer (1) and in its idle position is detachably secured on ferro-magnetic means (56) which is arranged on said base plate (2) and interacts with the permanent magnet (33).

4. Thermometer as in claim 3, wherein the permanent magnet (33) is arranged invisibly on the inside of the slide element (9) which is not visible to the observer.

5. Thermometer as in one of claim 1, wherein the two lets (6, 7) of the capillary tube (5) are arranged in grooves (20, 21) arranged on the visible side of the base plate (2).

6. Thermometer as in claim 5, wherein the grooves (20, 21) are rectangular in cross-section and have a depth such that the two legs (6, 7) of the capillary tube (5) can respectively only be inserted in said grooves to 50%.

7. Thermometer as in claim 3, wherein the adhesive strips (13, 14) are permanently inserted in the base of the grooves (20, 21), and are preferably glued in.

8. Thermometer as in claim 1, wherein the adhesive strips (13, 14) are brightyl coated on their side facing the observer, preferably in white.

9. Thermometer as in claim 1, wherein the base plate (2) is made of a transparent or translucent material, preferably plastic, and in that the upper and lower covering caps (8, 9) are made of a non-transparent material.

10. Thermometer as in claim 1, wherein in the upper and lower cover caps (8, 9) are provided with notch portions (27, 28/31, 32) which in the operating position can be engaged with corresponding counter-notches or grooves forming a groove guide along the sides of the base plate (2) so that at least the lower covering cap (9) is movable along the groove guide of the base plate (2).

11. Maximum-minimum thermometer with a base plate having a top end and a lower end with temperature scales arranged thereon and with a U-shaped capillary tube which contains an extension medium, a mercury filament and magnetically attractable display pins, wherein each pin has a least one elastically deformable holder or brake element which in the operating position resiliently abuts the inner wall of the capillary tube and which can be returned to their initial position by a magnet passing on the outside of the capillary tube, wherein the base plate (2) has a slide element (9) displaceably mounted along the two legs (6, 7) of the capillary tube (5) and along the temperature scales (3, 4), while overlapping them, on which at least one permanent magnet (33) is arranged with a magnetic force exceeding the holding force of the holding or braking element (55), by which the two display pins (11, 12) can be simultaneously returned by the corresponding motion of said slide element (9) from their extreme positions to their initial positions on the end of the mercury filament (10), and wherein said slide element forms a lower end cap for covering said bent end of said U-shaped capillary tube and is movable from the bottom of the lower end of the base plate to the extreme positions of the display pins for returning said display pins to their initial positions when the lower end cap is returned to the bottom of the lower end of the base plate.

* * * * *